(12) United States Patent
Kou et al.

(10) Patent No.: US 12,187,915 B2
(45) Date of Patent: Jan. 7, 2025

(54) PROCESS OF MAKING SILICONE-IN-WATER EMULSIONS

(71) Applicant: BASF SE, Ludwigshafen am Rhein (DE)

(72) Inventors: Huiguang Kou, Ludwigshafen am Rhein (DE); Ralf Knischka, Ludwigshafen am Rhein (DE); Andreas Gernandt, Ludwigshafen am Rhein (DE); Clemens Auschra, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 17/268,621

(22) PCT Filed: Jul. 26, 2019

(86) PCT No.: PCT/EP2019/070152
§ 371 (c)(1),
(2) Date: Feb. 16, 2021

(87) PCT Pub. No.: WO2020/035286
PCT Pub. Date: Feb. 20, 2020

(65) Prior Publication Data
US 2021/0171780 A1    Jun. 10, 2021

(30) Foreign Application Priority Data

Aug. 14, 2018 (EP) ...................... 18188812

(51) Int. Cl.
*C09D 5/02* (2006.01)
*C09D 183/04* (2006.01)

(52) U.S. Cl.
CPC ........... *C09D 5/022* (2013.01); *C09D 183/04* (2013.01)

(58) Field of Classification Search
CPC .............................. C09D 5/022; C09D 183/04
USPC ..................................................... 106/287.1
See application file for complete search history.

(56) References Cited

U.S. PATENT DOCUMENTS

| 4,518,727 | A | 5/1985 | Traver |
| 6,037,407 | A | 3/2000 | Derian et al. |
| 6,737,444 | B1 | 5/2004 | Liu |
| 8,877,293 | B2 | 11/2014 | Evans et al. |
| 2004/0132621 | A1* | 7/2004 | Frisch ............... A01N 25/04 504/363 |
| 2006/0154848 | A1* | 7/2006 | Girboux ............ A61Q 13/00 512/1 |
| 2010/0137454 | A1 | 6/2010 | Barmes et al. |
| 2014/0312284 | A1* | 10/2014 | Liu .................... B22F 1/07 252/514 |

FOREIGN PATENT DOCUMENTS

| CN | 100495024 | C | * | 6/2009 |
| CN | 100594968 | C |   | 3/2010 |
| DE | 19703705 | A1 |   | 1/1998 |
| EP | 680991 | A2 | * | 11/1995 |
| EP | 1646696 | B1 |   | 5/2010 |
| GB | 2092608 | A |   | 8/1982 |
| JP | 2013177495 | A | * | 9/2013 |
| WO | 2004/048461 | A2 |   | 6/2004 |
| WO | 2005/016998 | A2 |   | 2/2005 |
| WO | WO-2016014609 | A1 | * | 1/2016 |

OTHER PUBLICATIONS

Machine translation of EP 680991 A2 originally published Nov. 1995 to Beuschel et al. (Year: 1995).*
Machine translation of CN 100495024 C originally published Jun. 2009 to Hu et al. (Year: 2009).*
Machine translation of JP 2013177495 A originally published Sep. 2013 to Aoki et al. (Year: 2013).*
ThermoFisher: Solvents [online], [retrieved on May 13, 2022]. Retrieved from the internet: < URL: https://www.thermofisher.in/chemicals/en/brands/qualigens/solvents.html > (Year: 2022).*
AOCS: Emulsions: making oil and water mix [online], [retrieved on May 13, 2022]. Retrieved from the internet: < URL: https://www.aocs.org/stay-informed/inform-magazine/featured-articles/emulsions-making-oil-and-water-mix-Apr. 2014?SSO=True#:~:text=An > (Year: 2022).*
PubChem: Sodium dodecyl sulfate [online], [retrieved on May 16, 2022]. Retrieved from the internet: < URL: https://pubchem.ncbi.nlm.nih.gov/compound/Sodium-dodecyl-sulfate#section=RXCUI > (Year: 2022).*
Homogenizers: Rotor Stator Homogenizers [online], [retrieved on May 16, 2022]. Retrieved from the internet: < URL: https://homogenizers.net/collections/rotor-stator-homogenizers > (Year: 2022).*
Elvers et al., "Ullmann's Encyclopedia of Industrial Chemistry—Nucleic Acids to Parasympatholytics", Arpe, 5th Edition, vol. A18, Dec. 1, 1991, pp. 368-426.

(Continued)

*Primary Examiner* — Stefanie J Cohen
*Assistant Examiner* — Ritu S Shirali
(74) *Attorney, Agent, or Firm* — Faegre Drinker Biddle & Reath LLP

(57) ABSTRACT

Disclosed is a process of making silicone-in-water emulsion, compositions including a silicone-in-water emulsion and use of the compositions as an additive in paint and coating formulations, printing ink compositions, personal care products, textiles, leather and indirect food contact applications. The process includes contacting a silicone with an organic non-polar solvent, adding an anionic surfactant, and further adding water under shear, to obtain a silicone-in-water emulsion; and removing the non-polar solvent, wherein the silicone-in-water emulsion has a particle size distribution Dv50 in the range from ≥0.1 μm to ≤25 μm, determined according to dynamic light scattering technique with a fixed scattering angle of 90°.

17 Claims, No Drawings

(56) References Cited

OTHER PUBLICATIONS

European Search Report for EP Patent Application No. 18188812.4, Issued on Feb. 4, 2019, 3 pages.
International Preliminary Report on Patentability received for PCT Patent Application No. PCT/EP2019/070152, mailed on Feb. 25, 2021, 8 pages.
International Search Report and Written Opinion received for PCT Patent Application No. PCT/EP2019/070152, mailed on Sep. 10, 2019, 10 pages.

* cited by examiner

PROCESS OF MAKING SILICONE-IN-WATER EMULSIONS

CROSS-REFERENCE TO RELATED APPLICATIONS

This application is a national stage application (under 35 U.S.C. § 371) of PCT/EP2019/070152, filed Jul. 26, 2019, which claims benefit of European Application No. 18188812.4, filed Aug. 14, 2018, both of which are incorporated herein by reference in their entirety.

The presently claimed invention relates to a process of making silicone emulsions, compositions comprising a silicone-in-water emulsion and use of the compositions as an additive in paint and coating formulations, printing ink compositions, personal care products, textiles, leather and indirect food contact applications.

BACKGROUND OF THE INVENTION

Silicone additives are extensively used in the paint and coating industry as slipping and anti-blocking agents.

Films in coating formulations tend to adhere to each other due to e.g. low glass transition temperature binders or rub on each other due to a high coefficient of friction. Silicone additives are added to modify the surface properties of a film and lower the friction between film layers and other surfaces. Numerous coating applications require a reduction in the coefficient of friction (CoF). For example, in the printing industry, slip allows for faster production speeds, insurance against paper jams and of course, sensory benefits for the end user. CoF is also an indicator of resistance to mechanical damage.

Anti-blocking additives are added to formulations to minimize the adhesion between the film layers. Once compounded into a formulation these additives create a micro-rough surface which reduces the adhesion between film layers and reduces the blocking tendency.

Silicone additives are also used to impart anti-blocking properties in indirect food contact applications, for example, in food packaging and processing plants.

Silicone emulsions are well known in the art. However, the incorporation of water incompatible silicone oils having high viscosity into water is a difficult task. The state of the art provides numerous processes for making silicone-in-water emulsions such as mechanical emulsification and emulsion polymerization.

It is known that silicone oil-in-water emulsions require an additive to stabilize the emulsion, that is to prevent the droplets of silicone oil from coalescing into a continuous oil phase. The additives used are surfactants or emulsifiers. The surfactants may be selected from the group consisting of anionic, cationic, non-ionic, amphoteric and mixture of surfactants.

Examples of surfactants that are suitable for silicon oil-in-water emulsions are given in many published patents, for example, in WO 2005/016998 A2.

U.S. Pat. No. 8,877,293 B2 provides a process of making a silicone gum using EO/PO block copolymers as emulsifiers.

CN 100594968 C provides a method of dispersing high viscosity silicone and utilizes high viscosity silicone emulsifier (polyether modified silicone) along with a common emulsifier (anionic or non-ionic emulsifiers, preferably non-ionic) and thickeners.

US 2010/137454 A1 provides a method of preparing silicone oil-in-water emulsions comprising the steps of preparing the polysiloxane containing polymer in the presence of an inert fluid (organopolysiloxane extender or plasticizer), optionally adding the surfactant to form an oil phase, adding water to form an oil-in-water emulsion and applying shear to the water-in-oil emulsion to cause inversion of the water-in-oil emulsion to an oil-in-water emulsion.

U.S. Pat. No. 6,737,444 B1 provides a method of preparing an aqueous silicone resin emulsion which employs an inversion assisting polymer (a silicone functional or organofunctional polysiloxane) to prepare an oil-in-water emulsion.

U.S. Pat. No. 4,518,727 B1 provides a process for preparing an emulsifier system comprising a combination of anionic and methyl cellulose ether emulsifiers which are effective for dispersing silicone resins in a water-based coating system.

The prior art also discloses various mechanical methods wherein different devices have been used to prepare the silicone-in-water emulsion.

EP 1646696 B1 provides a silicon emulsion formed by inversion of water-in-oil emulsion to oil-in-water emulsion by applying shear in a twin-screw extruder having a length to diameter L/D ratio of at least 15.

U.S. Pat. No. 6,037,407 A provides an aqueous emulsion of organopolysiloxane prepared by kneading a mixture of silicone, water, surface active agent, and one water-soluble thickening polymer in a kneading device with stirrers.

WO 2004/048461 A2 provides a tire dressing formulation with silicone microemulsion and a wetting agent. The silicone microemulsion comprises amino functional silicone in fluid form.

DE 19703705 A1 provides a fungicidal impregnation against microorganisms such as molds, wall sponges, algae, to concrete, brick, mortar and plaster in buildings, which contains inorganic silicates, siliconates, silicone or acrylic emulsion, copper and water.

In the process of preparation of a silicone-in-water emulsion, it is difficult to incorporate water into mixtures containing high viscosity silicones and surfactants, and at the same time impart sufficient shear to obtain emulsified silicone. Further, the use of specialized devices such as twin-screw extruders are costly, both from capital and operational stand point. Furthermore, with the prior art processes it is difficult to control the particle size of silicone in the silicone-in-water emulsion which is of immense importance in the dispersion stability of paints and coating formulations, personal care products and indirect food contact applications. Stability is generally achieved by preventing coalescence of the particles by means of ionic or steric repulsion between particles due to the adsorption of a surfactant on the particle surface. For example, in paint and coating formulations, properties like stability during storage, application properties of liquid paint, stability during exposure, gloss level, opacity and color development etc. are largely related to the dispersion stability. Controlling the particle size distribution is relevant during dispersing as it influences both the optical and bulk properties of, for example, pigment dispersions in coating formulations. A narrow particle size distribution is required for stability of dispersions.

Even though silicone-in-water emulsions are being commercially prepared and used for many years, there is still an ongoing need to identify a simple process for making a silicone-in-water emulsion, wherein the particle size of the silicone-in-water emulsion can be controlled, and a narrow particle size distribution is achieved.

Further, the regulatory requirements necessitate the development of emulsified silicone with low volatile organic compounds (VOC) content. The organic solvents used to disperse the particles during the preparation of silicone-in-water emulsion contribute to the emission of VOC and it is therefore required to remove the organic solvents after the formation of the product. Thus, there is always a need to lower the amount of residual organic solvents to achieve a low VOC content of the emulsified silicone.

Therefore, it was an object of the presently claimed invention to provide a process of making a silicone-in-water emulsion, wherein the particle size distribution of the silicone-in-water emulsion can be controlled and the amount of the residual organic non-polar solvents in the silicone-in-water emulsion is low, such that the silicone-in-water emulsion obtained has a narrow particle size distribution and low content of the residual organic non-polar solvent, and upon addition to paint and coating formulations, personal care products, textiles, leather and indirect food contact applications imparts better slipping and anti-blocking properties.

SUMMARY OF THE INVENTION

Surprisingly, it has been found that a silicone-in-water emulsion having a particle size distribution $D_v50$ in the range from $\geq 0.1$ μm to $\leq 25$ μm and having at least one organic non-polar solvent in an amount in the range from 0 ppm to $\leq 1000$ ppm can be prepared by contacting silicone with the at least one organic non-polar solvent to obtain a solution, adding at least one anionic surfactant selected from the group consisting of metal salts of monoalkyl sulfosuccinates, metal salts of dialkyl sulfosuccinates, metal salts of alkyl sulfates, metal salts of alkyl ether sulfates, metal salts of olefin sulfonates, metal salts of linear alkyl benzene sulfonates, alkoxylated alkyl polyglycol ether phosphates, metal salts of alkoxylated alkyl polyglycol ether phosphates, metal salts of alkyl phosphate esters, metal salts of alkyl ether phosphates and metal salts of alkyl-aryl ether phosphates to the solution to obtain a mixture, adding water under shear to the mixture and removing the at least one organic non-polar solvent.

The inventors surprisingly found that they are able to obtain a silicone-in-water emulsion by contacting organic non-polar solvents with silicone in the step i) and then adding specific anionic surfactants in step ii), followed by addition of water under shear in step iii) and removal of the organic non-polar solvents. The process provides a narrow particle size distribution, i.e. a silicone-in-water emulsion having a particle size distribution $D_v50$ in the range from $\geq 0.1$ μm to $\leq 25$ μm, and the organic non-polar solvent is in an amount in the range from 0 ppm to $\leq 1000$ ppm, which aids in imparting better slipping and anti-blocking properties when a composition comprising the silicone-in-water emulsion is added to the paint and coating formulations, personal care products, textiles, leather and indirect food contact applications.

In the following, specific embodiments of the present invention are described:

1. A process of making a silicone-in-water emulsion comprising
   i) contacting at least one silicone with at least one organic non-polar solvent to obtain a solution;
   ii) adding at least one anionic surfactant selected from the group consisting of metal salts of monoalkyl sulfosuccinates, metal salts of dialkyl sulfosuccinates, metal salts of alkyl sulfates, metal salts of alkyl ether sulfates, metal salts of olefin sulfonates, metal salts of linear alkyl benzene sulfonates, alkoxylated alkyl polyglycol ether phosphates, metal salts of alkoxylated alkyl polyglycol ether phosphates, metal salts of alkyl phosphate esters, metal salts of alkyl ether phosphates, and metal salts of alkyl-aryl ether phosphates to the solution obtained in step i) to obtain a mixture;
   iii) adding water under shear, applied to the mixture obtained in step ii), to obtain a silicone-in-water emulsion; and
   iv) removing the at least one organic non-polar solvent, wherein the silicone-in-water emulsion has a particle size distribution $D_v50$ in the range from $\geq 0.1$ μm to $\leq 25$ μm, determined according to dynamic light scattering technique with a fixed scattering angle of 90°.

2. The process according to embodiment 1, wherein the particle size distribution $D_v50$ of the silicone-in-water emulsion is in the range from $\geq 0.1$ μm to $\leq 10$ μm determined according to dynamic light scattering technique with a fixed scattering angle of 90°.

3. The process according to one or more of embodiments 1 or 2, wherein the particle size distribution $D_v50$ of the silicone-in-water emulsion is in the range from $\geq 1$ μm to $\leq 10$ μm determined according to dynamic light scattering technique with a fixed scattering angle of 90°.

4. The process according to embodiment 1, wherein the particle size distribution $D_v90$ of the silicone-in-water emulsion is in the range from $\geq 0.1$ μm to $\leq 25$ μm determined according to dynamic light scattering technique with a fixed scattering angle of 90°.

5. The process according to embodiment 4, wherein the particle size distribution $D_v90$ of the silicone-in-water emulsion is in the range from $\geq 1$ μm to $\leq 25$ μm determined according to dynamic light scattering technique with a fixed scattering angle of 90°.

6. The process according to one or more of embodiments 1 to 5, wherein the at least one organic non-polar solvent has a polarity index in the range from $\geq 0.0$ to $\leq 4.5$.

7. The process according to one or more of embodiments 1 to 6, wherein the at least one organic non-polar solvent is selected from the group consisting of benzene, toluene, xylene, hexamethyldisiloxane, carbon tetrachloride, cyclohexane, pentane, hexane, cyclohexane, and chloroform.

8. The process according to one or more of embodiments 1 to 7, wherein the at least one organic non-polar solvent is selected from the group consisting of hexamethyldisiloxane and xylene.

9. The process according to one or more of embodiments 1 to 8, wherein the at least one organic non-polar solvent is xylene.

10. The process according to one or more of embodiments 1 to 9, wherein the at least one silicone has a viscosity in the range from $\geq 0.1$ m²/sec to $\leq 30000$ m²/sec at a temperature of 25° C., according to DIN 53019.

11. The process according to one or more of embodiments 1 to 10, wherein in step i) the weight ratio of the at least one silicone to the at least one organic solvent is from 1:20 to 1:1.

12. The process according to one or more of embodiments 1 to 11, wherein the solution obtained in step i) has a viscosity in the range from $\geq 0.1$ Pa·s to $\leq 100$ Pa·s at a temperature of 25° C. according to "Anton Paar MCR 302" rheometer with a cone-plate geometry of 25 mm diameter (cone angle 1°) with the shear rate of 1 s$^{-1}$.
13. The process according to one or more of embodiments 1 to 12, wherein the step i) is carried out at a temperature in the range from ≥30° C. to ≤150° C.
14. The process according to embodiment 1, wherein the at least one anionic surfactant is a sodium salt of dialkyl sulfosuccinate, wherein alkyl is linear or branched, unsubstituted $C_8$, $C_9$ or $C_{10}$ alkyl.
15. The process according to embodiment 1, wherein the at least one anionic surfactant is selected from the group consisting of sodium dioctyl sulfosuccinate and sodium di(2-ethylhexyl) sulfosuccinate.
16. The process according to embodiment 1, wherein the at least one anionic surfactant is a sodium salt or potassium salt of an alkyl sulfate, wherein alkyl is linear, unsubstituted $C_8$, $C_{10}$, $C_{12}$ or $C_{14}$ alkyl.
17. The process according to embodiment 1, wherein the at least one anionic surfactant is sodium dodecyl sulfate.
18. The process according to embodiment 1, wherein the at least one anionic surfactant is alkoxylated alkyl polyglycol ether phosphates.
19. The process according to one or more of embodiments 1 to 18, wherein in step ii) the weight ratio of the at least one anionic surfactant to the at least one silicone is from 1:1 to 1:50.
20. The process according to one or more of embodiments 1 to 19, wherein the step ii) is carried out at a temperature in the range from ≥30° C. to ≤150° C.
21. The process according to one or more of embodiments 1 to 20, wherein in step iii) the shear is applied through a homogenizer selected from the group consisting of ultrasonic, beadmill and high-pressure homogenizer.
22. The process according to one or more of embodiments 21, wherein the high-pressure homogenizer is operated at a pressure in the range from ≥0.5×10$^7$ Pa to ≤10×10$^7$ Pa.
23. The process according to one or more of embodiments 1 to 22, wherein the step iii) is carried out at a temperature in the range from ≥70° C. to ≤150° C.
24. The process according to embodiment 1, wherein the step iv) is carried out at a temperature in the range from ≥70° C. to ≤150° C.
25. The process according to embodiment 1, wherein in step iv) amount of the organic non-polar solvent is in the range from 0 to ≤1000 ppm.
26. The process according to embodiment 1, wherein in step iv) amount of the organic non-polar solvent is in the range from ≥1 to ≤1000 ppm.
27. The process according to one or more of embodiments 1 to 26, wherein the solid content of the silicone-in-water emulsion is in the range from ≥10% to ≤80%.
28. The process according to one or more of embodiments 1 to 27, wherein the silicone-in-water emulsion has a viscosity in the range from ≥0.1 Pa·s to ≤100 Pa·s at a temperature of 25° C., according to "Anton Paar MCR 302" rheometer with a cone-plate geometry of 25 mm diameter (cone angle 1°) with the shear rate of 1 s$^{-1}$.
29. A composition comprising a silicone-in-water emulsion containing a continuous phase and a dispersed phase comprising:
a) at least one silicone;
b) at least one anionic surfactant selected from the group consisting of metal salts of monoalkyl sulfosuccinates, metal salts of dialkyl sulfosuccinates, metal salts of alkyl sulfates, metal salts of alkyl ether sulfates, metal salts of olefin sulfonates, metal salts of linear alkyl benzene sulfonates, alkoxylated alkyl polyglycol ether phosphates, metal salts of alkoxylated alkyl polyglycol ether phosphates, metal salts of alkyl phosphate esters, metal salts of alkyl ether phosphates and metal salts of alkyl-aryl ether phosphates;
c) water; and
d) organic non-polar solvent,
wherein the amount of the organic non-polar solvent is in the range from 0 to ≤1000 ppm, and
wherein water is in the continuous phase and the at least one silicone is in the dispersed phase, and silicone-in-water emulsion has a particle size distribution $D_v50$ in the range from ≥0.1 μm to ≤25 μm, determined according to dynamic light scattering technique with a fixed scattering angle of 90°.
30. The composition according to embodiment 29, wherein the amount of the organic non-polar solvent is in the range from ≥1 to ≤1000 ppm.
31. The composition according to embodiment 29, wherein the at least one organic non-polar solvent is selected from the group consisting of benzene, toluene, xylene, hexamethyldisiloxane, carbon tetrachloride, cyclohexane, pentane, hexane, cyclohexane and chloroform.
32. The composition according to one or more of embodiments 29 to 31, wherein the at least one silicone has a viscosity in the range from ≥0.1 m$^2$/sec to ≤30000 m$^2$/sec at a temperature of 25° C., according to DIN 53019.
33. The composition according to embodiment 29, wherein the at least one anionic surfactant is sodium dioctyl sulfosuccinate.
34. The composition according to embodiment 29, wherein the at least one anionic surfactant is sodium dodecyl sulfate.
35. The composition according to embodiment 29, wherein the at least one anionic surfactant is alkoxylated alkyl polyglycol ether phosphates.
36. The composition according to one or more of embodiments 29 to 35, wherein the silicone-in-water emulsion has a viscosity in the range from ≥0.1 Pa·s to ≤100 Pa·s at a temperature of 25° C., according to "Anton Paar MCR 302" rheometer with a cone-plate geometry of 25 mm diameter (cone angle 1°) with the shear rate of 1 s$^{-1}$.
37. The composition according to one or more of embodiments 29 to 36, wherein the weight ratio of the at least one anionic surfactant to the at least one silicone is from 1:1 to 1:50.
38. The composition according to one or more of embodiments 29 to 37, wherein the particle size distribution $D_v50$ of the silicone-in-water emulsion is in the range from ≥0.1 μm to ≤10 μm determined according to dynamic light scattering technique with a fixed scattering angle of 90°.
39. The composition according to one or more of embodiments 29 to 38, wherein the composition comprises a) ≥20 wt.-% to ≤70 wt.-% of the at least one silicone; b) 0.5 wt.-% to ≤20 wt.-% of the at least one anionic surfactant; and d) ≥10 wt.-% to 80 wt.-% of water.
40. Use of the composition according to one of more of embodiments 29 to 39 as an additive in paint and coating formulations, printing ink compositions, personal care products, textiles, leather and indirect food contact applications.

41. An aqueous composition in the form of a coating composition or printing ink composition or personal care product composition having, ≥0.01 wt.-% to ≤20 wt.-% by weight, based on the total weight of the aqueous composition, composition in form of silicone-in-water emulsion according to one or more of embodiments 29 to 39 or a composition prepared according to one or more of embodiments 1 to 28; and additionally, pigments, fillers, binders, solvents, defoamer, acrylic emulsions, neutralizers, UV absorbers, matting agents and dispersing agents, whereby the sum of weight percentages of components adds up to 100% by weight.

42. A composition comprising a silicone-in-water emulsion containing a continuous phase and a dispersed phase consisting of:
   a) at least one silicone;
   b) at least one anionic surfactant selected from the group consisting of metal salts of monoalkyl sulfosuccinates, metal salts of dialkyl sulfosuccinates, metal salts of alkyl sulfates, metal salts of alkyl ether sulfates, metal salts of olefin sulfonates, metal salts of linear alkyl benzene sulfonates, alkoxylated alkyl polyglycol ether phosphates, metal salts of alkoxylated alkyl polyglycol ether phosphates, metal salts of alkyl phosphate esters, metal salts of alkyl ether phosphates and metal salts of alkyl-aryl ether phosphates;
   c) water; and
   d) organic non-polar solvent,
   wherein the amount of the organic non-polar solvent is in the range from 0 to ≤1000 ppm, and,
   wherein water is in the continuous phase and the at least one silicone is in the dispersed phase, and silicone-in-water emulsion has a particle size distribution $D_v50$ in the range from ≥0.1 μm to ≤25 μm, determined according to dynamic light scattering technique with a fixed scattering angle of 90°.

43. The composition according to embodiment 42, wherein the amount of the organic non-polar solvent is in the range from ≥1 to ≤1000 ppm.

DETAILED DESCRIPTION OF THE INVENTION

Before the present process of the invention and various embodiments are described in detail, it is to be understood that this invention is not limited to particular process described, since such processes may, of course, vary. It is also to be understood that the terminology used herein is not intended to be limiting, since the scope of the present invention will be limited only by the appended claims.

If hereinafter a group is defined to comprise at least a certain number of embodiments, this is meant to also encompass a group which preferably consists of these embodiments only. In case the terms "first", "second", "third" or "i)", "ii)", "iii)", or "(A)", "(B)" and "(C)" or "(a)", "(b)", "(c)", "(d)", etc. relate to steps of a method or use or assay there is no time or time interval coherence between the steps, that is, the steps may be carried out simultaneously or there may be time intervals of seconds, minutes, hours, days, weeks or even months between such steps, unless otherwise indicated in the application as set forth herein above or below.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

The presently claimed invention is directed to a process of making a silicone-in-water emulsion having a particle size distribution $D_v50$ in the range from ≥0.1 μm to ≤25 μm and having at least one organic non-polar solvent in an amount in the range from 0 ppm to ≤1000 ppm, comprising, i) contacting silicone with organic non-polar solvent to obtain a solution, ii) adding at least one anionic surfactant selected from the group consisting of metal salts of monoalkyl sulfosuccinates, metal salts of dialkyl sulfosuccinates, metal salts of alkyl sulfates, metal salts of alkyl ether sulfates, metal salts of olefin sulfonates, metal salts of linear alkyl benzene sulfonates, metal salts of alkoxylated alkyl polyglycol ether phosphates, metal salts of alkyl phosphate esters, metal salts of alkyl ether phosphates and metal salts of alkyl-aryl ether phosphates to the solution of step i) to obtain a mixture, iii) adding water under shear to the mixture, and iv) removing the at least one organic non-polar solvent.

When a composition comprising the silicone-in-water emulsion obtained by the process of the presently claimed invention is added to the paint and coating formulations, personal care products, textiles, leather and indirect food contact applications, the silicone-in-water emulsion aids in imparting better slipping and anti-blocking properties which is demonstrated by low values of the dynamic coefficient of friction (CoF).

The term "alkyl", as used herein, refers to an acyclic saturated aliphatic group that is solely constituted of carbon atoms and hydrogen atoms, including linear or branched alkyl residues. Furthermore, the alkyl residue is preferably unsubstituted.

As used herein, "branched" denotes a chain of atoms with one or more side chains attached to it. Branching occurs by the replacement of a substituent, e.g., a hydrogen atom, with a covalently bonded aliphatic moiety.

An emulsion is defined as a heterogenous liquid system involving two immiscible phases, with one of the phase being intimately dispersed in the form of droplets in the second phase. The matrix of an emulsion is called the external or continuous phase, while the portion of emulsion that is in form of droplet is called the internal, dispersed or discontinuous phase. In particular, in context of the present invention which provides a process for making a silicone-in-water emulsion, the emulsion is an oil-in-water type of emulsion, wherein oil droplets are suspended in an aqueous phase, i.e. silicone is in the dispersed phase and water is in the continuous phase.

The particle size of the silicone-in-water emulsion is obtained from the particle size distribution. The particle size distribution can be determined on a volume, surface or length basis. The volume particle size is equal to the diameter of the sphere that has the same volume as a given particle. The emulsion may be characterized by an average volume particle of the dispersed silicone oil in a continuous aqueous phase. Droplet (oil-in-water emulsion) as well as particle (polymer dispersion) size can be measured by using dynamic light scattering (DLS) technique (also known as photon correlation spectroscopy (PSC) or quasi-elastic light scattering (QELS)). Suitable laser diffraction techniques are well known in the art.

The term $D_v$ represents the average volume particle size of the dispersed particles. $D_v50$ is the particle size measured in volume corresponding to 50% of the cumulative particle population. In other words, if $D_v=0.5$ µm, 50% of the particles have an average volume particle size below 0.5 µm and 50% of the particles have a volume average particle size above 0.5 µm. Similarly, $D_v90$ is the particle size measured in volume corresponding to 90% of the cumulative particle population.

In a preferred embodiment of the presently claimed invention, the silicone-in-water emulsion has a particle size distribution $D_v50$ in the range from ≥0.1 µm to ≤25 µm, determined according to dynamic light scattering technique with a fixed scattering angle of 90°, preferably in the range from ≥0.5 µm to ≤20 µm, or ≥1 µm to ≤15 µm, more preferably in the range from ≥1.5 µm to ≤10 µm, and most preferably in the range from 0.1 µm to ≤10 µm, or 1 µm to ≤10 µm, or 1 µm to ≤5 µm.

In another preferred embodiment of the presently claimed invention, the silicone-in-water emulsion having a particle size distribution $D_v50$ in the range from ≥0.1 µm to ≤10 µm, determined according to dynamic light scattering technique with a fixed scattering angle of 90°, preferably in the range from in the range from ≥0.5 µm to ≤10 µm, or ≥1 µm to 10 µm, more preferably from 2 µm to ≤10 µm, and most preferably in the range from 2 µm to ≤5 µm.

In a preferred embodiment of the presently claimed invention, the composition comprises a silicone-in-water emulsion having a particle size distribution $D_v90$ in the range from ≥0.1 µm to ≤25 µm, determined according to dynamic light scattering technique with a fixed scattering angle of 90°, preferably in the range from ≥0.5 µm to ≤25 µm, or ≥1 µm to 25 µm, more preferably from ≥1 µm to ≤15 µm, and most preferably in the range from 5 µm to ≤15 µm.

In a preferred embodiment of the presently claimed invention, the composition comprises a silicone-in-water emulsion having a particle size distribution $D_v90$ in the range from ≥1 µm to 25 µm, determined according to dynamic light scattering technique with a fixed scattering angle of 90°, preferably in the range from ≥5 µm to ≤25 µm, or ≥5 µm to ≤20 µm, more preferably from 5 µm to ≤15 µm, and most preferably in the range from ≥5 µm to 10 µm.

In another preferred embodiment of the presently claimed invention, the silicone-in-water emulsion has a particle size distribution $D_v90$ in the range from ≥1 µm to ≤10 µm, determined according to dynamic light scattering technique with a fixed scattering angle of 90°, preferably in the range from ≥2 µm to ≤9 µm, or ≥2 µm to ≤8 µm, more preferably in the range from 2 µm to ≤7.5 µm, and most preferably in the range from ≥2 µm to ≤7 µm.

In a preferred embodiment of the presently claimed invention, the at least one silicone is a polydimethylsiloxane (PDMS) which contains at least ≥70% by weight, more preferably at least ≥80% by weight, and most preferably at least ≥90% by weight of dimethylsilyloxy (DMS) groups, based on the total weight of the silicone oil.

In another preferred embodiment of the presently claimed invention, the at least one silicone is a liquid at 100° C., more preferably at 40° C.

In a preferred embodiment of the presently claimed invention, the at least one silicone is selected from the following polydimethylsiloxanes types:

S1: pure polydimethylsiloxanes, i.e. linear or Si-branched polysiloxanes which essentially consist of dimethylsilyloxy groups and terminal trimethylsilyloxy groups, preferably those with $M_w$ in the range from 800 to 1000000 g/mol, especially from 1000 to 500000 g/mol;

S2: α,ω-terminated polydimethylsiloxanes, i.e. linear or Si-branched polysiloxanes having terminal $C_2$-$C_{30}$-alkyl groups, which are interrupted by at least one functional moiety selected from —O—, —OC═O— or —NHC═O—, or terminal $C_1$-$C_{10}$-alkoxy groups, preferably those with $M_w$ in the range from 800 to 100000 g/mol, especially from 1000 to 50000 g/mol;

S3: Polysiloxanes of the formula

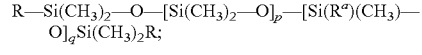

where q is an integer from 1 to 500 and p is and an integer from 0 to 500 with p+q being at least 2, in particular at least 5, e.g. from 2 to 1000, in particular from 5 to 500;

R is $CH_3$, $C_2$-$C_{22}$ alkyl, halogenated $C_1$-$C_{22}$ alkyl, $C_5$-$C_{22}$ cycloalkyl, or an aromatic hydrocarbon radical having 6 to 22 carbon atoms, such as phenyl or phenyl-$C_1$-$C_4$-alkyl, and $R^a$ is $C_2$-$C_{22}$ alkyl, halogenated $C_1$-$C_{22}$ alkyl, $C_5$-$C_{22}$ cycloalkyl, an aromatic hydrocarbon radical having 6 to 22 carbons, such as phenyl or phenyl-$C_1$-$C_4$-alkyl, or —[Si(CH$_3$)$_2$—O]$_p$—[Si(R$^b$)(CH$_3$)—O]$_q$Si(CH$_3$)$_2$R, where n and m are identical or different and an integer from 1 to 100 with n+m being at least 1, R is as defined above and $R^b$ is a radical selected from $C_2$-$C_{22}$ alkyl, halogenated $C_1$-$C_{22}$ alkyl, $C_5$-$C_{22}$ cycloalkyl and an aromatic hydrocarbon radical having 6 to 22 carbons, such as phenyl or phenyl-$C_1$-$C_4$-alkyl.

In the polysiloxanes S3, the moieties —[Si(CH$_3$)$_2$—O]— and —[Si(R$^a$)(CH$_3$)—O]— and, if present, moieties —[Si(CH$_3$)$_2$—O]— and —[Si(R$^b$)(CH$_3$)—O]— may be arranged statistically or blockwise. The polysiloxanes S3 preferably have an $M_w$ in the range from 800 to 500000 g/mol, especially from 1000 to 100000 g/mol.

S4: Polysiloxanes of the formula

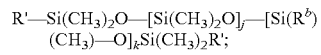

where k is an integer from 1 to 500 and j is and an integer from 0 to 500 with j+k being at least 2, in particular at least 5, e.g. from 2 to 1000, in particular from 5 to 500;

R' is $CH_3$, halogenated $C_1$-$C_{22}$ alkyl, or a $C_2$-$C_{30}$-alkyl group, which is interrupted by at least one functional moiety selected from —O—, —OC═O— or —NHC═O—, and $R^c$ is a $C_2$-$C_{30}$-alkyl group, which is interrupted by at least one functional moiety selected from —O—, —OC═O— or —NHC═O—, or —[Si(CH$_3$)$_2$—O]$_n$—[Si(R$^d$)(CH$_3$)—O]$_m$Si(CH$_3$)$_2$R', where n and m are identical or different and an integer from 1 to 100 with n+m being at least 1,
R' is as defined above and
$R^d$ is a $C_2$-$C_{30}$-alkyl group, which is interrupted by at least one functional moiety selected from —O—, —OC=O— or —NHC=O—.

In the polysiloxanes S4, the moieties —[Si(CH$_3$)$_2$—O]— and —[Si(R$^c$)(CH$_3$)—O]— and, if present, moieties —[Si(CH$_3$)$_2$—O]— and —[Si(R$^d$)(CH$_3$)—O]— may be arranged statistically or blockwise. The polysiloxanes S4 preferably have an $M_w$ in the range from 800 to 500000 g/mol, especially from 1000 to 100000 g/mol.

In a preferred embodiment of the presently claimed invention, the at least one silicone is a blend of the PDMS types S1 to S4 described above, with different molecular weights and structures.

In a preferred embodiment of the presently claimed invention, the at least one silicone is a single type of PDMS. In another preferred embodiment, the at least one silicone is a mixture of at least two silicone oils having different average molecular weights.

In a preferred embodiment of the presently claimed invention, the at least one silicone has a viscosity in the range from ≥0.1 m$^2$/sec to ≤30000 m$^2$/sec at a temperature of 20° C., according to DIN 53019. More preferably, the viscosity is in the range from ≥1 m$^2$/sec to ≤3000 m$^2$/sec, even more preferably the viscosity is in the range from ≥1 m$^2$/sec to ≤300 m$^2$/sec or ≥5 m$^2$/sec to ≤300 m$^2$/sec, yet even more preferably the viscosity is in the range from ≥10 m$^2$/sec to ≤100 m$^2$/sec, still even preferably the viscosity is in the range from ≥10 m$^2$/sec to ≤80 m$^2$/sec, and most preferably the viscosity is in the range from ≥10 m$^2$/sec to ≤70 m$^2$/sec, at a temperature of 20° C., according to DIN 53019.

In a preferred embodiment of the presently claimed invention, the process of making a silicone-in-water emulsion comprises, i) contacting at least one silicone with at least one organic non-polar solvent to form a solution. It is beneficial to preferably bring silicone in form of a solution as a solution reduces the viscosity as compared to pure silicone, and the homogenization of the solution into an emulsion is thereby facilitated.

In a preferred embodiment of the presently claimed invention, the at least one organic non-polar solvent has a polarity index in the range from ≥0.0 to ≤4.5, more preferably in the range from ≥0.0 to ≤4.2, or ≥0.0 to ≤4, even more preferably in the range from ≥0.1 to ≤3.5, yet even more preferably in the range from ≥0.2 to ≤3 and most preferably in the range from ≥0.5 to ≤2.5.

In a preferred embodiment of the presently claimed invention, the at least one organic non-polar solvent is selected from the group consisting of benzene, toluene, xylene, hexamethyldisiloxane, carbon tetrachloride, cyclohexane, pentane, hexane, cyclohexane, and chloroform, preferably from the group consisting of toluene, xylene and hexamethyldisiloxane, more preferably from the group consisting of hexamethyldisiloxane and xylene, and most preferably the at least one organic non-polar solvent is xylene.

In a preferred embodiment of the presently claimed invention, in step i) the weight ratio of the at least one silicone to the at least one organic non-polar solvent is from 1:20 to 1:1, more preferably from 1:18 to 1:1, or from 1:15 to 1:1, even more preferably from 1:12 to 1:1, yet even more preferably from 1:10 to 1:1, and most preferably from 1:7 to 1:1, or from 1:5 to 1:1.

In a preferred embodiment of the presently claimed invention, the solution obtained in step i) has a viscosity in the range from ≥0.1 Pa·s to ≤100 Pa·s at a temperature of 25° C. according to a "Anton Paar MCR 302" rheometer with a cone-plate geometry of 25 mm diameter (cone angle 1°) with the shear rate of 1 s$^{-1}$, preferably, the viscosity is in the range of ≥0.5 Pa·s to ≤100 Pa·s, or ≥0.6 Pa·s to ≤100 Pa·s, or ≥0.7 Pa·s to ≤100 Pa·s, or ≥0.8 Pa·s to ≤100 Pa·s, or ≥1 Pa·s to ≤100 Pa·s, even more preferably, the viscosity is in the range of ≥1 Pa·s to ≤80 Pa·s, or ≥1 Pa·s to ≤70 Pa·s, or ≥1 Pa·s to ≤60 Pa·s, or ≥1 Pa·s to ≤50 Pa·s, or ≥1.3 Pa·s to ≤50 Pa·s, and most preferably, in the range of ≥1.5 Pa·s to ≤50 Pa·s, or ≥1.5 Pa·s to ≤45 Pa·s, or ≥1.5 Pa·s to ≤40 Pa·s, or ≥2 Pa·s to ≤40 Pa·s, or ≥5 Pa·s to ≤40 Pa·s.

In a preferred embodiment of the presently claimed invention, the step i) is carried out at a temperature in the range from ≥30° C. to ≤150° C., more preferably in the range from ≥40° C. to ≤145° C., or 40° C. to ≤140° C., or ≥45° C. to ≤135° C., even more preferably in the range from 50° C. to ≤130° C., or ≥55° C. to ≤120° C., or ≥60° C. to ≤110° C., and most preferably in the range from ≥70° C. to ≤100° C.

In a preferred embodiment of the presently claimed invention, the process of making a silicone-in-water emulsion comprises, ii) adding at least one anionic surfactant to the solution obtained in step i) to obtain a mixture.

In a preferred embodiment of the presently claimed invention, the at least one anionic surfactant is selected from the group consisting of at least one anionic surfactant selected from the group consisting of metal salts of monoalkyl sulfosuccinates, metal salts of dialkyl sulfosuccinates, metal salts of alkyl sulfates, metal salts of alkyl ether sulfates, metal salts of olefin sulfonates, metal salts of linear alkyl benzene sulfonates, alkoxylated alkyl polyglycol ether phosphates, metal salts of alkoxylated alkyl polyglycol ether phosphates, metal salts of alkyl phosphate esters, metal salts of alkyl ether phosphates, and metal salts of alkyl-aryl ether phosphates.

In another preferred embodiment of the presently claimed invention, the at least one anionic surfactant is selected from the group consisting of metal salts of dialkyl sulfosuccinates, metal salts of alkyl ether sulfates, and alkoxylated alkyl polyglycol ether phosphates.

In another preferred embodiment of the presently claimed invention, the at least one anionic surfactant is a metal salt of a dialkyl sulfosuccinate of the general formula (I),

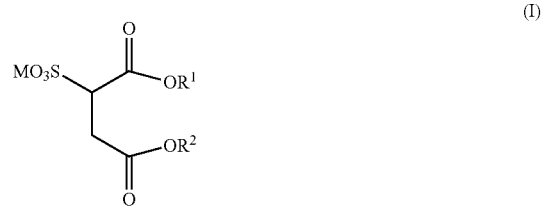

wherein
$R^1$ and $R^2$ denotes identical or different, linear or branched, unsubstituted $C_6$-$C_{14}$ alkyl, and M denotes an alkali metal.

Representative examples of linear and branched $C_6$-$C_{14}$ alkyl include, but are not limited to, n-hexyl, n-heptyl, n-octyl, n-nonyl, n-decyl, n-undecyl, n-dodecyl, 2-ethylhexyl, 2-propyl heptyl, 2-butyl-1-octyl, isohexyl, isoheptyl, isooctyl, isodecyl, isoundecyl and isododecyl.

In a preferred embodiment of the presently claimed invention, $R^1$ and $R^2$ are identical and selected from n-hexyl, n-heptyl, n-octyl, 2-ethylhexyl, 2-propyl heptyl, isohexyl, isoheptyl and isooctyl. More preferably, $R^1$ and $R^2$ are identical and selected from n-octyl and 2-ethylhexyl.

In a preferred embodiment of the presently claimed invention, M is selected from sodium or potassium, more preferably M is sodium.

In a preferred embodiment of the presently claimed invention, the at least one anionic surfactant is a sodium salt of dialkyl sulfosuccinate, wherein alkyl is linear or branched, unsubstituted $C_8$, $C_9$ or $C_{10}$ alkyl, most preferably the at least one anionic surfactant is selected from the group consisting of sodium dioctyl sulfosuccinate and sodium di(2-ethylhexyl) sulfosuccinate.

In another preferred embodiment of the presently claimed invention, the at least one anionic surfactant is a metal salt of an alkyl sulfate of the general formula (II):

$$R^3OSO_3M \qquad (II)$$

wherein $R^3$ denotes linear or branched, unsubstituted $C_8$-$C_{16}$ alkyl, and M denotes an alkali metal.

For the purposes of the presently claimed invention, the term "$C_8$-$C_{16}$-alkyl" covers acyclic saturated hydrocarbon residues, which may be linear or branched and unsubstituted having 8 to 16 carbon atoms.

Representative examples of linear and branched $C_8$-$C_{16}$ alkyl include, but are not limited to, n-octyl, n-nonyl, n-decyl, n-undecyl, n-dodecyl, n-tridecyl, n-tetradecyl, n-pentadecyl, n-hexadecyl, 2-ethylhexyl, 2-propyl heptyl, 2-butyl-1-octyl, 2-pentyl-1-nonyl, isooctyl, isodecyl, isoundecyl, isododecyl, isotridecyl, isotetradecyl, isopentadecyl and isohexadecyl.

In a preferred embodiment of the presently claimed invention $R^3$ is selected from the group consisting of n-octyl, n-nonyl, n-decyl, n-undecyl, n-dodecyl, n-tridecyl and n-tetradecyl, more preferably $R^3$ is selected from the group consisting of n-octyl, n-nonyl, n-decyl, n-undecyl and n-dodecyl, and most preferably $R^3$ is n-dodecyl.

In a preferred embodiment of the presently claimed invention, M is selected from sodium or potassium ion, more preferably M is sodium.

In another preferred embodiment of the presently claimed invention, the at least one anionic surfactant is a sodium salt or potassium salt of an alkyl sulfate, wherein alkyl is linear, unsubstituted $C_8$, $C_{10}$, $C_{12}$ or $C_{14}$ alkyl, preferably the at least one anionic surfactant is sodium dodecyl sulfate.

In yet another preferred embodiment of the presently claimed invention the at least one anionic surfactant is an ethoxylated alkyl polyglycol ether phosphates of the general formula (III),

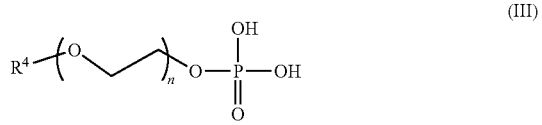

(III)

wherein $R^4$ denotes linear or branched, unsubstituted $C_8$-$C_{16}$ alkyl n is in the range of 1 to 15.

When the fatty alcohol $R^4$—OH which is used for the synthesis of ethoxylated alkyl polyglycol ether phosphate is derived from a natural source, it is common to have mixtures, e.g. of $C_{16}$ and $C_{18}$ alcohols or $C_{12}$ and $C_{14}$ alcohols.

In a preferred embodiment of the presently claimed invention, $R^4$ is selected from n-octyl, n-nonyl, n-decyl, n-undecyl, n-dodecyl, n-tridecyl, n-tetradecyl, n-pentadecyl, n-hexadecyl, 2-ethylhexyl, 2-propyl heptyl, 2-butyl-1-octyl, 2-pentyl-1-nonyl, isooctyl, isodecyl, isoundecyl, isododecyl, isotridecyl, isotetradecyl, isopentadecyl, isohexadecyl and mixtures thereof, more preferably, $R^4$ is selected from n-octyl, n-decyl, n-dodecyl, n-tetradecyl and mixtures thereof and, most preferably $R^4$ is selected from n-dodecyl, n-tetradecyl and mixtures thereof.

In another preferred embodiment of the presently claimed invention, n is in the range from ≥1 to ≤10, more preferably in the range from ≥2 to ≤8, and most preferably in the range from ≥2 to ≤6.

In a preferred embodiment of the presently claimed invention, in the step ii), the weight ratio of the at least one anionic surfactant to the at least one silicone is from 1:1 to 1:50, more preferably from 1:2 to 1:45, even more preferably from 1:2 to 1:40, yet even more preferably from 1:3 to 1:35, and most preferably form 1:4 to 1:30.

In a preferred embodiment of the presently claimed invention, the step ii) is carried out at a temperature in the range from ≥30° C. to ≤150° C., more preferably in the range from ≥40° C. to ≤145° C., or ≥40° C. to ≤140° C., or ≥45° C. to ≤135° C., even more preferably in the range from ≥50° C. to ≤130° C., or ≥55° C. to ≤120° C., or ≥60° C. to ≤110° C., and most preferably in the range from ≥70° C. to ≤100° C.

In a preferred embodiment of the presently claimed invention, in step iii), the shear is applied through a homogenizer selected from the group consisting of ultrasonic, beadmill and high-pressure homogenizer. Preferably, a high-pressure homogenizer, for example a Gaulin homogenizer, is used for making the silicone-in-water emulsion according to the present invention.

In another preferred embodiment of the presently claimed invention, in step iii) a pre-emulsion is formed by adding water under stirring using dissolvers such as Dispermat or using Scandex disperser which uses glass beads prior to the application of shear using high pressure homogenizer.

High pressure homogenizers are generally used for homogenizing the sample or reducing the particle size of the components present in it, while preparing emulsions. High pressure homogenizer consists of a high-pressure pump and a homogenizing nozzle. The pump is used to compress the crude emulsion to the required pressure. During depressurization in the homogenizing nozzle, the drops are disrupted. The nozzle is decisive for the efficiency of disruption for emulsions prepared with high pressure homogenization. High pressure homogenizers can be classified according to the nozzle type or the mechanism that disrupts the droplet.

In a preferred embodiment of the presently claimed invention, the high pressure homogenizer is operated at a pressure in the range from ≥0.5×10⁷ Pa to ≤10×10⁷ Pa, more preferably in the range from 1×10⁷ Pa to ≤10×10⁷ Pa, or ≥2×10⁷ Pa to ≤10×10⁷ Pa, even more preferably in the range from ≥3×10⁷ Pa to ≤10×10⁷ Pa, or ≥4×10⁷ Pa to ≤10×10⁷ Pa, and most preferably in the range from ≥4×10⁷ Pa to ≤9×10⁷ Pa, or ≥5×10⁷ Pa to ≤8×10⁷ Pa In a preferred embodiment of the presently claimed invention, the step iii) is carried out at a temperature in the range from ≥70° C. to ≤150° C., more preferably in the range from ≥75° C. to 150° C., or ≥75° C. to ≤145° C., even more preferably in the range from ≥80° C. to ≤140° C., or ≥85° C. to ≤135° C., yet even more preferably in the range from ≥90° C. to ≤130° C., or 95° C. to ≤125° C., and most preferably in the range from ≥100° C. to ≤120° C.

In a preferred embodiment of the presently claimed invention, in step iv) the at least one organic non-polar solvent is removed.

In a preferred embodiment of the presently claimed invention, in step iv) the amount of the organic non-polar solvent is in an amount in the range from ≥0 ppm to ≤1000 ppm.

In another preferred embodiment of the presently claimed invention, in step iv) the amount of the organic non-polar solvent is in an amount in the range from ≥1 ppm to ≤1000 ppm In a preferred embodiment of the presently claimed invention, the amount of the organic non-polar solvent is in the range from ≥1 ppm to ≤1000 ppm, more preferably in the range from 1 ppm to ≤800 ppm or in the range from ≥10 ppm to ≤800 ppm, more preferably in the range from ≥20 ppm to ≤800 ppm or in the range from ≥30 ppm to ≤800 ppm or in the range from ≥40 ppm to ≤800 ppm, yet even more preferably in the range from 50 ppm to ≤700 ppm or in the range of ≥60 ppm to ≤600 ppm, and most preferably in the range of 100 ppm to ≤500 ppm.

In another preferred embodiment of the presently claimed invention, the solid content of the silicone-in-water emulsion is in the range from ≥10% to ≤80%, more preferably in the range from 15% to ≤80%, even more preferably in the range from ≥15% to ≤75%, yet even more preferably in the range from ≥20% to ≤80%, and most preferably ≥20% to ≤70%.

In a preferred embodiment of the presently claimed invention, the silicone-in-water emulsion has a viscosity in the range from ≥0.1 Pa·s to ≤100 Pa·s at a temperature of 25° C., according to "Anton Paar MCR 302" rheometer with a cone-plate geometry of 25 mm diameter (cone angle 1°) with the shear rate of 1 s$^{-1}$, more preferably, the viscosity is in the range of ≥0.5 Pa·s to ≤100 Pa·s, or ≥0.6 Pa·s to ≤100 Pa·s, or ≥0.7 Pa·s to ≤100 Pa·s, or 0.8 Pa·s to ≤100 Pa·s, or ≥1 Pa·s to ≤100 Pa·s, even more preferably, the viscosity is in the range of ≥1 Pa·s to ≤80 Pa·s, or ≥1 Pa·s to ≤70 Pa·s, or ≥1 Pa·s to ≤60 Pa·s, or ≥1 Pa·s to ≤50 Pa·s, or ≥1.3 Pa·s to ≤50 Pa·s, and most preferably, in the range of ≥1.5 Pa·s to ≤50 Pa·s, or ≥1.5 Pa·s to ≤45 Pa·s, or ≥1.5 Pa·s to ≤40 Pa·s, or 2 Pa·s to ≤40 Pa·s, or ≥5 Pa·s to ≤40 Pa·s.

In another aspect, the presently claimed invention provides a composition comprising a silicone in-water emulsion containing a continuous phase and a dispersed phase comprising: a) at least one silicone; b) at least one anionic surfactant selected from the group consisting of metal salts of monoalkyl sulfosuccinates, metal salts of dialkyl sulfosuccinates, metal salts of alkyl sulfates, metal salts of alkyl ether sulfates, metal salts of olefin sulfonates, metal salts of linear alkyl benzene sulfonates, alkoxylated alkyl polyglycol ether phosphates, metal salts of alkoxylated alkyl polyglycol ether phosphates, metal salts of alkyl phosphate esters, metal salts of alkyl ether phosphates and metal salts of alkyl-aryl ether phosphates, c) water, and d) organic non-polar solvent, wherein the amount of the organic non-polar solvent is less than 1000 ppm, and wherein water is in the continuous phase and the at least one silicone is in the dispersed phase, and silicone-in-water emulsion has a particle size distribution D$_v$50 in the range from ≥0.1 μm to ≤25 μm, determined according to dynamic light scattering technique with a fixed scattering angle of 90°.

In a preferred embodiment of the presently claimed invention, the composition comprises at least one organic non-polar solvent which is selected from the group consisting of benzene, toluene, xylene, hexamethyldisiloxane, carbon tetrachloride, cyclohexane, pentane, hexane, cyclohexane, and chloroform, preferably from the group consisting of toluene, xylene and hexamethyldisiloxane, more preferably from the group consisting of toluene and xylene, and most preferably the at least one organic non-polar solvent is xylene.

In a preferred embodiment of the presently claimed invention, the composition comprises at least silicone which has a viscosity in the range from ≤0.1 m$^2$/sec to ≤30000 m$^2$/sec at a temperature of 20° C., according to DIN 53019. More preferably, the viscosity is in the range from ≥1 m$^2$/sec to ≤3000 m$^2$/sec, even more preferably the viscosity is in the range from ≥1 m$^2$/sec to ≤300 m$^2$/sec or ≥5 m$^2$/sec to ≤300 m$^2$/sec, yet even more preferably the viscosity is in the range from ≥10 m$^2$/sec to ≤100 m$^2$/sec, still even preferably the viscosity is in the range from ≥10 m$^2$/sec to ≤80 m$^2$/sec, and most preferably the viscosity is in the range from ≥10 m$^2$/sec to ≤70 m$^2$/sec, at a temperature of 20° C., according to DIN 53019.

In a preferred embodiment of the presently claimed invention, the composition comprises anionic surfactants selected from the group consisting of sodium dioctyl sulfosuccinate, sodium dodecyl sulfate and metal salts of alkoxylated alkyl polyglycol ether phosphates.

In a preferred embodiment of the presently claimed invention, the silicone-in-water emulsion of the composition has a viscosity in the range from ≥0.1 Pa·s to ≤100 Pa·s at a temperature of 25° C., according to "Anton Paar MCR 302" rheometer with a cone-plate geometry of 25 mm diameter (cone angle 1°) with the shear rate of 1 s$^{-1}$, more preferably, the viscosity is in the range of ≥0.5 Pa·s to ≤100 Pa·s, or ≥0.6 Pa·s to ≤100 Pa·s, or ≥0.7 Pa·s to ≤100 Pa·s, or ≥0.8 Pa·s to ≤100 Pa·s, or ≥1 Pa·s to ≤100 Pa·s, even more preferably, the viscosity is in the range of ≥1 Pa·s to ≤80 Pa·s, or ≥1 Pa·s to ≤70 Pa·s, or ≥1 Pa·s to ≤60 Pa·s, or ≥1 Pa·s to ≤50 Pa·s, or ≥1.3 Pa·s to ≤50 Pa·s, and most preferably, in the range of ≥1.5 Pa·s to ≤50 Pa·s, or ≥1.5 Pa·s to ≤45 Pa·s, or ≥1.5 Pa·s to ≤40 Pa·s, or ≥2 Pa·s to ≤40 Pa·s, or ≥5 Pa·s to ≤40 Pa·s.

In a preferred embodiment of the presently claimed invention, the composition comprises a silicone-in-water emulsion having a particle size distribution D$_v$50 in the range from ≥0.1 μm to ≤10 μm, determined according to dynamic light scattering technique with a fixed scattering angle of 90°, preferably in the range from ≥0.5 μm to ≤10 μm, or ≥1 μm to ≤10 μm, more preferably from ≥2 μm to ≤10 μm, and most preferably in the range from ≥2 μm to ≤5 μm.

In a preferred embodiment of the presently claimed invention, in the composition, the weight ratio of the at least one anionic surfactant to the at least one silicone is from 1:1 to 1:50, more preferably from 1:2 to 1:45, even more preferably from 1:2 to 1:40, yet even more preferably from 1:3 to 1:35, and most preferably form 1:4 to 1:30.

In a preferred embodiment of the presently claimed invention, the composition comprises, a) ≥20 wt.-% to ≤70 wt.-% of the at least one silicone; b) ≥0.5 wt.-% to ≤20 wt.-% of the at least one anionic surfactant; and d) ≥10 wt.-% to ≤80 wt.-% of water.

In another preferred embodiment of the presently claimed invention, the composition comprises ≥20 wt.-% to ≤70 wt.-% of the at least one silicone, more preferably ≥20 wt.-% to ≤65 wt.-%, even more preferably ≥25 wt.-% to ≤65 wt.-%, and most preferably ≥30 wt.-% to ≤60 wt.-%.

In another preferred embodiment of the presently claimed invention, the composition comprises ≥0.5 wt.-% to ≤20 wt.-% of the at least one anionic surfactant, more preferably ≥1 wt.-% to ≤20 wt.-%, or ≥1.5 wt.-% to ≤20 wt.-%, even more preferably ≥2.0 wt.-% to −20 wt.-%, or 2.5 wt.-% to ≤20 wt.-%, and most preferably ≥3 wt.-% to ≤20 wt.-%, or −5 wt.-% to ≤15 wt.-%.

In another preferred embodiment of the presently claimed invention, the composition comprises ≥10 wt.-% to ≤80 wt.-% of water, more preferably ≥20 wt.-% to ≤80 wt.-%, or ≥25 wt.-% to ≤80 wt.-%, even more preferably ≥30 wt.-% to ≤70 wt.-%, and most preferably from ≥35 wt.-% to ≤70 wt.-%.

In a preferred embodiment, the presently claimed invention provides the use of the composition comprising the silicone-in-water emulsion as an additive in paint and coating formulations, printing ink compositions, personal care products, textiles, leather and indirect food contact applications.

In an embodiment, the presently claimed invention provides an aqueous composition in the form of a coating composition or printing ink composition or personal care composition, which comprises the composition comprising the silicone-in-water emulsion according to the presently claimed invention in the range from ≥0.01 wt.-% to ≤20 wt.-%, more preferably in the range from ≥0.01 wt.-% to ≤15 wt.-%, even more preferably in the range from ≥0.01 wt.-% to ≤10 wt.-%, yet even more preferably in the range from ≥0.1 wt.-% to ≤10 wt.-%, still more preferably in the range from ≥0.1 wt.-% to ≤7 wt.-%, most preferably in the range from 0.1 wt.-% to ≤5 wt.-% or in the range from ≥0.1 wt.-% to ≤3 wt.-%, as an additive, based on the total weight of the aqueous composition; and additionally, pigments, fillers, binders, solvents, defoamer, acrylic emulsions, neutralizers, UV absorbers, matting agents and dispersing agents, whereby the sum of weight percentages of components adds up to 100% by weight.

Pigments

Organic or inorganic pigments are suitable as additives. Examples of organic pigments are color pigments and mother-of-pearl-like pigments such as azo, disazo, naphthol, benzimidazolone, azo condensation, metal complex, isoindolinone, quinophthalone, and dioxazine pigments, polycyclic pigments such as indigo, thioindigo, quinacridones, phthalocyanines, perylenes, perinones, anthraquinones, e.g., aminoanthraquinones or hydroxyanthraquinones, anthrapyrimidines, indanthrones, flavanthrones, pyranthrones, anthanthrones, isoviolanthrones, diketopyrrolopyrroles, and also carbazoles, e.g., carbazole violet, and the like. Other examples of organic pigments can be found in the following monograph: W. Herbst, K. Hunger, "Industrielle Organische Pigmente", 2" edition, 1995, VCH Verlagsgesellschaft, ISBN: 3-527-28744-2. Examples of inorganic pigments are titanium dioxide, metallic flakes, such as aluminum and also aluminum oxide, iron (III) oxide, chromium (III) oxide, titanium (IV) oxide, zirconium(IV)oxide, zinc oxide, zinc sulfide, zinc phosphate, mixed metal oxide phosphates, molybdenum sulfide, cadmium sulfide, graphite, vanadates such as bismuth vanadate, chromates, such as lead(IV) chromates, molybdates such as lead(IV) molybdate, and mixtures thereof.

Fillers

Suitable fillers are, for example, organic or inorganic particulate materials such as, for example, calcium carbonates and silicates, and inorganic fiber materials such as glass fibers, for example. Organic fillers as well, such as carbon fibers, and mixtures of organic and inorganic fillers, such as mixtures of glass fibers and carbon fibers or mixtures of carbon fibers and inorganic fillers, for example, may find application. The fillers can be added in an amount of 1 wt.-% to ≤75 wt.-%, based on the total weight of the composition.

Binders

Suitable binders are the ones customarily used, for example the ones described in 30 Ullmann's Encyclopedia of Industrial Chemistry, 5th Edition, Vol. A18, pp. 368-426, VCH, Weinheim 1991, Germany. In general, the film-forming binder is based on a thermoplastic or thermosetting resin, predominantly on a thermosetting resin. Examples thereof are alkyd, acrylic, polyester, phenolic, melamine, epoxy and polyurethane resins and mixtures thereof. Also, resins curable by radiation or air-drying 35 resins can be used. Binders may also be derived from polyvinylalcohol and polyvinylbutyral. Binders include latex polymers made by emulsion polymerization. For architectural coatings, especially preferred latex polymers are based on acrylic emulsion polymers, styrene-acrylic emulsion polymers, vinyl acetate-acrylic emulsion polymers or emulsion polymers based on ethylene and vinyl acetate. Preferably, the binder is present in the range of from 2 wt.-% to ≤40 wt.-%, more preferably in the range of from 5 wt.-% to ≤30 wt.-%, based on the weight of the paint composition.

Defoamers

Suitable defoamers are selected from the wide range of defoamers used for water-based systems such as silicone based defoamers, emulsion defoamers, star polymer based defoamers, powder defoamers, oil based defoamers.

Solvents

The solvent is selected from any organic solvents that are typically used to prepare coating compositions. The organic solvent may include a combination of two or more solvents. Preferably, the organic solvent is an alcohol, glycol or acetone. The glycol solvent helps reduce viscosity and may aid wetting or film coalescence. Representative glycol solvents include ethylene glycol, ethylene glycol methyl ether, ethylene glycol ethyl ether, ethylene glycol monobutyl ether, ethylene glycol-2-ethylhexyl ether, propylene glycol, propylene glycol methyl ether, propylene glycol ethyl ether, propylene glycol monobutyl ether, propylene glycol-2-ethylhexyl ether, diethylene glycol, diethylene glycol methyl ether, diethylene glycol ethyl ether, diethylene glycol monobutyl ether, diethylene glycol-2-ethylhexyl ether, dipropylene glycol, dipropylene glycol methyl ether, dipropylene glycol ethyl ether, dipropylene glycol monobutyl ether, dipropylene glycol-2-ethylhexyl ether, and mixtures thereof hydrophilic glycol solvents (e.g., propylene glycol methyl ether or dipropylene glycol monomethyl ether) are preferred.

In one embodiment, the organic solvent is an alcohol. Representative alcohol solvents include both lower molecular weight alcohols; such as methanol, ethanol, propanol, and butanol; as well as branched hydrocarbyl based alcohols like Texanol® solvents; such as 2,2,4-trimethyl-1,3-pentanediolmono(2-methylpropanoate).

Most preferably, the organic solvent is a combination of a glycol and alcohol, as described above, for example an isomeric mixture of dipropylene glycol monomethyl ether, methoxypropoxypropanol and methyldipropylene glycol.

Acrylic Emulsions

Acrylic emulsions in context of the present invention refer to any water-based emulsion of a polyacrylate, polymethacrylate, or other similar copolymers derived from acrylic or methacrylic acid. Many acrylic emulsions are available commercially for ready use in paints and coating formulations. These acrylic emulsions are often described as self-crosslinkable acrylic emulsions, which may be used in the present coating compositions. Representative self-crosslinkable acrylic emulsions include useful in the present compositions include; ALBERDINGK AC 2S14, ALBERDINGK AC 25142, ALBERDINGK AC 2518, ALBERDINGK AC 2523, ALBERDINGK AC 2524, ALBERDINGK AC 2537, ALBERDINGK AC 25381, ALBERDINGK AC 2544, ALBERDINGK AC 2546, ALBERDINGK MAC 24, and ALBERDINGK MAC 34 polymer dispersions from Alberdingk Boley, Inc.; EPS 2538 and EPS 2725 acrylic emulsions from EPS Corp.; RHOPLEXN 3131-LO, RHOPLEX E-693, RHOPLEX E-940, RHOPLEX E-1011, RHOPLEX E-2780, RHOPLEX HG-95P, RHOPLEX HG-700, RHOPLEX HG-706, RHOPLEX PR-33, RHOPLEX TR-934HS, RHOPLEX TR-3349 and RHOPLEX™ VSR1050 acrylic emulsions from Rohm and Haas Co.; RHOSHIELD™ 636 and RHOSHELD 3188 polymer dispersions from Rohm and Haas Co; JONCRYL® 8380, 8300, 8211, 1532, 1555, 2560, 1972, 1980, 1982, and 1984 acrylic emulsions from BASF Corp.; NEOCRYL™ A-I 127, NEOCRYL A-6115, NEOCRYL XK-12, NEOCRYL XK-90, NEOCRYL XK-98 and NEOCRYL XK-220 acrylic latex polymers from DSM NeoResins, Inc., and mixtures thereof.

Depending on the intended use, the aqueous composition may further comprise one or more conventional additives. Conventional additives included e.g., rheology modifiers, wetting agents, neutralizer, organically modified polysiloxane, UV absorbers, matting agents, pigment dispersing agents, pigment synergists, preservatives, and the like.

Neutralizers

Suitable neutralizers are inorganic bases, organic bases, and combinations thereof. Examples of inorganic bases include but are not limited to the alkali metal hydroxides (especially lithium, sodium, potassium, magnesium, and ammonium), alkali metal carbonates, alkali metal hydrogen carbonates and alkali metal salts of inorganic acids, such as sodium borate (borax), sodium phosphate, sodium pyrophosphate, and the like; and mixtures thereof. Examples of organic bases include, but are not limited to, triethanolamine (TEA), diisopropanolamine, triisopropanolamine, aminomethyl propanol (2-amino-2-methyl-1-propanol), dodecylamine, cocamine, oleamine, morpholine, triamylamine, triethylamine, tetrakis(hydroxypropyl)ethylenediamine, L-arginine, methyl glucamine, isopropylamine, aminomethyl propanol, tromethamine (2-amino 2-hydroxymethyl-1,3-propanediol), and PEG-15 cocamine. Alternatively, other alkaline materials can be used alone or in combination with the above-mentioned inorganic and organic bases.

UV Absorbers

UV absorbers used are selected from the group consisting of benzotriazole derivatives, dimeric benzotriazole derivatives, halogenated benzotriazoles, benzophenone derivatives, triazine derivatives, dimeric triazine derivatives and diaryl cyanoacrylates etc.

Matting agents used are silica based matting agents or polymethyl urea resin.

The aqueous composition in the form of a coating composition or printing ink composition or personal care composition or composition for food contact application is prepared by combining the composition comprising the silicone-in-water of the present invention and other ingredients as discussed above with mixing.

The composition comprising the silicone-in-water emulsion of the present invention is useful in personal care products such as anti-perspirants and deodorants, skin care creams, skin care lotions, moisturizers, facial treatments such as acne or wrinkle removers, personal and facial cleansers, bath oils, perfumes, colognes, sachets, sunscreens, pre-shave and after-shave lotions, shaving soaps, and shaving lathers, hair shampoos, hair conditioners, hair colorants, hair relaxants, hair sprays, mousses, gels, permanents, depilatories, and cuticle coats, make-ups, color cosmetics, foundations, concealers, blushes, lipsticks, eyeliners, mascara, oil removers, color cosmetic removers, and powders, medicament creams, pastes or sprays including antiacne, dental hygienic, antibiotic, healing promotive, nutritive and the like, which may be preventative and/or therapeutic.

The composition comprising the silicone-in-water emulsion of the present invention, when used as an additive in indirect food contact applications, allows for Swiss A and FDA compliance due to, e.g. the particle size of its components and molecular weight.

The process of making a silicone-in-water emulsion according to the presently claimed invention offers one or more of the following advantages:

1. The presently claimed invention provides a simple process of making a silicone-in-water emulsion using specific anionic surfactants such as metal salts of monoalkyl sulfosuccinates, metal salts of dialkyl sulfosuccinates, metal salts of alkyl sulfates, metal salts of alkyl ether sulfates, metal salts of olefin sulfonates, metal salts of linear alkyl benzene sulfonates, alkoxylated alkyl polyglycol ether phosphates, metal salts of alkoxylated alkyl polyglycol ether phosphates, metal salts of alkyl phosphate esters, metal salts of alkyl ether phosphates and metal salts of alkyl-aryl ether phosphates; and by adding water under shear.

2. The presently claimed invention provides a process of making a silicone-in-water emulsion, wherein the particle size distribution of silicone-in-water emulsion can be controlled to obtain a narrow particle size distribution, i.e. $D_v50$ in the range from 0.1 μm to ≤25 μm and the amount of the organic non polar solvent in the silicone-in-water emulsion is in an amount in the range from 0 ppm to ≤1000 ppm. The invention provides a silicone-in-water emulsion with a narrow particle size distribution and having low amount of the organic solvent. Thus, the silicone-in-water emulsion of the present invention provides a stable dispersion with low amount of organic solvent, thereby reducing the VOC content.

3. When a composition comprising the silicone-in-water emulsion is added to the paint and coating formulations, personal care products, textiles, leather and indirect food contact applications, it aids in imparting better slipping and anti-blocking properties. In particular, when used as an additive in indirect food contact applications, it provides improved slip and anti-blocking properties, for example, in the films and wraps, and the use of these additives are also Swiss A and FDA compliant. When used as an additive in personal care products, and in textiles and leather it imparts smoothing effect and finishing effects, respectively.

Having generally described the invention, a further understanding can be obtained by reference to certain specific examples which are provided herein for the purpose of illustration only and are not intended to be limiting unless otherwise specified.

EXAMPLES

Compounds
- Joncryl® 8052 (CAS: 1185260-57-4), an acrylic acid emulsion,
- Disponil® SDS 15, sodium lauryl sulphate,
- Disponil® FEP 6300, alkyl polyglycol ether phosphate (3 EO), and
- Pluronic® F98, difunctional EO/PO block copolymer, are available from BASF SE, Ludwigshafen, Germany.

KORASILON® G30 M, polysiloxanes where some of the methyl groups are replaced by alkyl groups and/or aryl groups, having a viscosity of 30 m²/sec are available from Kurt Obermeier GmbH & Co. KG.

- Sodium dioctyl sulfosuccinate (DOSS), and
- Xylene, are available from Sigma-Aldrich.

Methods

Particle Size Measurement

Emulsion particle size is measured by using dynamic light scattering (DLS) technique (also known as photon correlation spectroscopy (PSC) or quasi-elastic light scattering (QELS)). Particle size of the emulsion was measured using Brookhaven's NanoDLS Nano-Particle Size Analyzer with a fixed scattering angle of 90° was used. The measurement leads to the mean diameter DINT i.e. length of intermediate axis of the particle (intensity weighted). The term $D_v$ represents the average volume particle size of the dispersed particle, for example $D_v$ 50 is the particle size measured in volume corresponding to 50% of the cumulative particle population.

Viscosity

The reported viscosities are obtained either by a rheometer according to a method in dependence to DIN 53019, or calculated at a temperature of 25° C., according to "Anton Paar MCR 302" rheometer with a cone-plate geometry of 25 mm diameter (cone angle 1°) at a shear rate of 1 s$^{-1}$.

Solid Content

Solid content was measured with a Mettler Toledo Moisture Analyzer HB43. Samples were dried at 200° C. until constant mass was reached.

Dynamic Coefficient of Friction

The dynamic coefficient of friction (CoF) can be determined using any standard procedure known in the art. One such non-limiting example is as follows—formulations are prepared by hand mixing. The paint was coated on PET film with a draw down bar of 60 μm at the speed of 20 mm/s. After drying for 24 hours, the force needed to move a metal bar over the film is measured with a RayRan 3600. The result is displayed as the calculated dynamic coefficient of friction. Results displayed here were measured after 1 week.

Residual Solvent

The amount of residual solvent was measured using gas chromatography.

Synthesis of Silicone-in-Water Emulsion

The process for making a silicone-in-water emulsion according to the present invention has been provided in the following non-limiting inventive examples.

Example 1

A 20% silicone gum solution was prepared via mixing 150 g of Korasilon® G30M (viscosity @ 25° C. is 30 m²/s) with 600 g of xylene at 90° C. by stirring. Then, 75 g of dioctyl sulfosuccinate sodium salt (DOSS) was added under stirring for further 1 hour at 90° C. The emulsion was formed by slowly adding 500 g of water under stirring (500 rpm for 30 minutes). The xylene was distilled out under nitrogen gas and stirring at the oil bath temperature of 120° C. The amount of residual xylene was 650 ppm. A part of water was also distilled out in this step. The silicone-in-water emulsion was obtained with a solid content of 20%.

Example 2

A 20% silicone gum solution was prepared via mixing 120 g of Korasilon® G30M (viscosity @ 25° C. is 30 m²/s) with 480 g of xylene at 90° C. by stirring. Then 30 g of dioctyl sulfosuccinate sodium salt (DOSS) was added under stirring for further 1 hour at 90° C. The emulsion was formed by slowly adding 400 g of water under stirring @ 2000 rpm (for 30 minutes) with Dispermat. The xylene was distilled out under nitrogen gas and stirring at the oil bath temperature of 120° C. The amount of residual xylene was 650 ppm. A part of water was also distilled out in this step. The silicone-in-water emulsion was obtained with a solid content of 30%.

Example 3

A 20% silicone gum solution was prepared via mixing 120 g of Korasilon® G30M (viscosity @ 25° C. is 30 m²/s) with 480 g of xylene at 90° C. by stirring. Then 15 g of dioctyl sulfosuccinate sodium salt (DOSS) was mixed under stirring for further 1 hour at 90° C. The emulsion was formed by slowly adding 400 g of water under stirring @ 2000 rpm (for 30 minutes) with Dispermat. The xylene was distilled out under nitrogen gas and stirring at the oil bath temperature of 120° C. The amount of residual xylene was 550 ppm. A part of water was also distilled out in this step. The silicone-in-water was obtained with a solid content of 40%.

Example 4

A 20% silicone gum solution was prepared via mixing 12 g of Korasilon® G30M (viscosity @ 25° C. is 30 m²/s) with 48 g of xylene at 90° C. by stirring. Then 1.5 g of dioctyl sulfosuccinate sodium salt (DOSS) was mixed under stirring for further 1 hour at 90° C. The pre-emulsion was formed by slowly adding 40 g of water under stirring @ 500 rpm (for 30 minutes). The pre-emulsion was transferred into glass bottle with 100 g glass beads (2 mm), and put into Scandex for 1 hr. The milk like emulsion was transferred back to the reactor. The xylene was distilled out under nitrogen gas and stirring at the oil bath temperature of 120° C. The amount of residual xylene was 500 ppm. A part of water was also distilled out in this step. The silicone-in-water emulsion was obtained with a solid content of 40%.

Example 5

A 20% silicone gum solution was prepared via mixing 120 g of Korasilon® G30M (viscosity @ 25° C. is 30 m²/s) with 480 g of xylene at 90° C. by stirring. Then 30 g dioctyl sulfosuccinate sodium salt (DOSS) was mixed under stirring for further 1 hour at 90° C. The pre-emulsion was formed by slowly adding 400 g of water under stirring @ 500 rpm (for 30 minutes). The pre-emulsion was transferred to Gaulin homogenizer for 1 cycle at a pressure of 1×10⁷ Pa. The milk like emulsion was transferred back to the reactor and xylene was distilled out under nitrogen gas and stirring at the oil bath temperature of 120° C. The amount of residual xylene was 600 ppm. A part of water was also distilled out in this step. The silicone-in-water was obtained with a solid content of 40%.

Example 6

A 20% silicone gum solution was prepared via mixing 120 g of Korasilon® G30M (viscosity @25° C. is 30 m²/s) with 480 g of xylene at 90° C. by stirring. Then 30 g of dioctyl sulfosuccinate sodium salt (DOSS) was mixed under stirring for further 1 hour at 90° C. The pre-emulsion was formed by slowly adding 400 g water under stirring @ 500 rpm (for 30 minutes). The pre-emulsion was transferred to Gaulin homogenizer for 1 cycle at a pressure of 5×10⁷ Pa. The milk like emulsion was transferred back to reactor and xylene was distilled out under nitrogen gas and stirring at the oil bath temperature of 120° C. The amount of residual xylene was 650 ppm. A part of water was also distilled out in this step. The silicone-in-water emulsion was obtained with a solid content of 40%.

Example 7

A 20% silicone gum solution was prepared via mixing 120 g of Korasilon® G30M (viscosity @ 25° C. is 30 m²/s) with 480 g of xylene at 90° C. by stirring. Then 15 g of dioctyl sulfosuccinate sodium salt (DOSS) was mixed under stirring for further 1 hour at 90° C. The pre-emulsion was formed by slowly adding 400 g of water under stirring @ 500 rpm (for 30 min). The pre-emulsion was transferred to Gaulin homogenizer for 1 cycle at a pressure of 8×10⁷ Pa. The milk like emulsion was transferred back to reactor and xylene was distilled out under nitrogen gas and stirring at the oil bath temperature of 120° C. The amount of residual xylene was 450 ppm. A part of water was also distilled out in this step. The silicone-in-water emulsion was obtained with a solid content of 40%.

Example 8

A 20% silicone gum solution was prepared via mixing 120 g of Korasilon® G30M (viscosity @ 25° C. is 30 m²/s) with 480 g hexamethyldisiloxane at 90° C. by stirring. Then 15 g of dioctyl sulfosuccinate sodium salt (DOSS) was mixed under stirring for further 1 hour at 90° C. The pre-emulsion was formed by slowly adding 400 g of water under stirring @ 500 rpm (for 30 minutes). The pre-emulsion was transferred to Gaulin homogenizer for 3 cycles at a pressure of 5×10⁷ Pa. The milk like emulsion was transferred back to reactor and the hexamethyldisiloxane was distilled out under nitrogen gas and stirring at the oil bath temperature of 120° C. The amount of residual xylene was 500 ppm. A part of water was also distilled out in this step. The silicone-in-water emulsion was obtained with a solid content of 50%.

Example 9

A 20% silicone gum solution was prepared via mixing 120 g of Korasilon® G30M (viscosity @ 25° C. is 30 m²/s) with 480 g of xylene at 90° C. by stirring. Then 10 g of dioctyl sulfosuccinate sodium salt (DOSS) mixed in by stirring for further 1 hour at 90° C. The pre-emulsion was formed by slowly adding 400 g of water under stirring @ 500 rpm (for 30 min). The pre-emulsion was transferred to Gaulin homogenizer for 1 cycle at a pressure of 8×10⁷ Pa. The milk like emulsion was transferred back to reactor and xylene was distilled out under nitrogen gas and stirring at the oil bath temperature of 120° C. The amount of residual xylene was 300 ppm. A part of water was also distilled out in this step. The silicone-in-water emulsion was obtained with a solid content of 60%.

Example 10

A 20% silicone gum solution was prepared via mixing 120 g of Korasilon® G30M (viscosity @25° C. is 30 m²/s) with 480 g of xylene at 90° C. by stirring. Then 8 g of dioctyl sulfosuccinate sodium salt (DOSS) was mixed under stirring for further 1 hour at 90° C. The pre-emulsion was formed by slowly adding 400 g of water under stirring @ 500 rpm (for 30 minutes). The pre-emulsion was transferred to Gaulin homogenizer for 3 cycles at a pressure of 5×10⁷ Pa. The milk like emulsion was transferred back to reactor and xylene was distilled out under nitrogen gas and stirring at the oil bath temperature of 120° C. The amount of residual xylene was 300 ppm. A part of water was also distilled out in this step. The silicone-in-water was obtained with a solid content of 60%.

Example 11

A 20% silicone gum solution was prepared via mixing 120 g of Korasilon® G30M (viscosity @ 25° C. is 30 m²/s) with 480 g of xylene at 90° C. by stirring. Then 6 g of dioctyl sulfosuccinate sodium salt (DOSS) was mixed under stirring for further 1 hour at 90° C. The pre-emulsion was formed by slowly adding 400 g of water under stirring @ 500 rpm (for 30 minutes). The pre-emulsion was transferred to Gaulin homogenizer for 2 cycles at a pressure of 8×10⁷ Pa. The milk like emulsion was transferred back to reactor and xylene was distilled out under nitrogen gas and stirring at the oil bath temperature of 120° C. The amount of residual xylene was 250 ppm. A part of water was also distilled out in this step. The silicone-in-water emulsion was obtained with a solid content of 60%.

Example 12

A 20% silicone gum solution was prepared via mixing 120 g of Korasilon® G30M (viscosity @ 25° C. is 30 m²/s) with 480 g of xylene at 90° C. by stirring. Then 66 g of Disponil® SDS 15 was mixed in by stirring for further 1 hour at 90° C. The pre-emulsion was formed by slowly adding 400 g of water under stirring @ 500 rpm (for 30 minutes). The pre-emulsion was transferred to Gaulin homogenizer for 1 cycle at a pressure of 5×10⁷ Pa. The milk like emulsion was transferred back to reactor and xylene was distilled out under nitrogen gas and stirring at the oil bath temperature of 120° C. The amount of residual xylene was 350 ppm. A part of water was also distilled out in this step. The silicone-in-water emulsion was obtained with a solid content of 60%.

Example 13

A 20% silicone gum solution was prepared via mixing 120 g of Korasilon® G30M (viscosity @ 25° C. is 30 m²/s) with 480 g of xylene at 90° C. by stirring. Then 53 g of Disponil® SDS 15 was mixed in by stirring for further 1 hr at 90° C. The pre-emulsion was formed by slowly adding 400 g of water under stirring @ 500 rpm (for 30 minutes). The pre-emulsion was transferred to Gaulin homogenizer for 1 cycle at a pressure of 5×10⁷ Pa. The milk like emulsion was transferred back to reactor and xylene was distilled out under nitrogen gas and stirring at the oil bath temperature of 120° C. The amount of residual xylene was 400 ppm. A part of water was also distilled out in this step. The silicone-in-water emulsion was obtained with a solid content of 60%.

Example 14

A 20% silicone gum solution was prepared via mixing 120 g of Korasilon® G30M (viscosity @ 25° C. is 30 m²/s) with 480 g of xylene at 90° C. by stirring. Then 10 g of Disponil® FEP 6300 was mixed under stirring for further 1 hour at 90° C. The pre-emulsion was formed by slowly adding 400 g of water under stirring @ 500 rpm (for 30 minutes). The pre-emulsion was transferred to Gaulin homogenizer for 1 cycle at a pressure of $5 \times 10^7$ Pa. The milk like emulsion was transferred back to reactor and xylene was distilled out under nitrogen gas and stirring at the oil bath temperature of 120° C. The amount of residual xylene was 550 ppm. A part of water was also distilled out in this step. The silicone-in-water emulsion was obtained with a solid content of 60%.

Example 15

A 20% silicone gum solution was prepared via mixing 120 g of Korasilon® G30M (viscosity @ 25° C. is 30 m²/s) with 480 g of xylene at 90° C. by stirring. Then 8 g of Disponil® FEP 6300 was mixed under stirring for further 1 hour at 90° C. The pre-emulsion was formed by slowly adding 400 g of water under stirring @ 500 rpm (for 30 minutes). The pre-emulsion was transferred to Gaulin homogenizer for 1 cycle at a pressure of $5 \times 10^7$ Pa. The milk like emulsion was transferred back to reactor and xylene was distilled out under nitrogen gas and stirring at the oil bath temperature of 120° C. The amount of residual xylene was 450 ppm. A part of water was also distilled out in this step. The silicone-in-water emulsion was obtained with a solid content of 60%.

Example 16

A 20% silicone gum solution was prepared via mixing 120 g of Korasilon® G30M (viscosity @ 25° C. is 30 m²/s) with 480 g of xylene at 90° C. by stirring. Then 4 g of dioctyl sulfosuccinate sodium salt (DOSS) was mixed under stirring for further 1 hour at 90° C. The pre-emulsion was formed by slowly adding 400 g of water under stirring @ 500 rpm (for 30 minutes). The pre-emulsion was transferred to Gaulin homogenizer for 3 cycles at a pressure of $8 \times 10^7$ Pa. The milk like emulsion was transferred back to reactor and xylene was distilled out under nitrogen gas and stirring at the oil bath temperature of 120° C. The amount of residual xylene was 650 ppm. A part of water was also distilled out in this step. The silicone-in-water emulsion was obtained with a solid content of 60%.

Out of Scope of the Invention Example 1

In this example, no surfactant was added during the process of making the silicone-in-water emulsion.

A 20% silicone gum solution was prepared via mixing 120 g of Korasilon® G30M (viscosity @ 25° C. is 30 m²/s) with 480 g of xylene at 90° C. by stirring. The pre-emulsion was formed by slowly adding 400 g of water under stirring @ 500 rpm (for 30 minutes). The pre-emulsion was transferred to Gaulin homogenizer for 1 cycle at a pressure of $5 \times 10^7$ Pa. During the homogenization through Gaulin homogenizer, some coagulation (clump block) formed, and stable emulsion was not formed.

Out of Scope of the Invention Example 2

In this example, instead of using an anionic surfactant, a di-functional EO/PO block copolymer was used as a surfactant for making the silicone-in-water emulsion.

A 20% silicone gum solution was prepared via mixing 120 g of Korasilon® G30M (viscosity @ 25° C. is 30 m²/s) with 480 g of xylene at 90° C. by stirring. Then 12 g of Pluronic® F98 was mixed under stirring for further 1 hour at 90° C. The pre-emulsion was formed by slowly adding 400 g of water under stirring @ 500 rpm (for 30 minutes). The pre-emulsion was transferred to Gaulin homogenizer for 1 cycle at a pressure of $5 \times 10^7$ Pa. During the Gaulin homogenizer process, small amount of coagulation (clump block) was formed. The milk like emulsion was transferred back to reactor and xylene was distilled out under nitrogen gas and stirring at the oil bath temperature of 120° C. A stable emulsion was not formed due to coagulation.

Measurement of the Particle Size Distribution ($D_v50$ and $D_v90$)

Particle size of the silicone-in-water emulsion according to the present invention was measured using Brookhaven's NanoDLS Nano-Particle Size Analyzer and results for inventive examples and out of scope of the invention examples have been summarized in Table 1.

TABLE 1

| Example numbers | $D_v50$ (in μm) | $D_v90$ (in μm) |
|---|---|---|
| 1 | 4.5 | 6.5 |
| 2 | 3.1 | 5.4 |
| 3 | 3.0 | 5.5 |
| 4 | 2.1 | 4.9 |
| 5 | 3.5 | 6.5 |
| 6 | 2.8 | 4.5 |
| 7 | 2.0 | 5.5 |
| 8 | 2.3 | 5.2 |
| 9 | 2.3 | 3.5 |
| 10 | 2.0 | 3.4 |
| 11 | 2.0 | 4.5 |
| 12 | 2.4 | 4.5 |
| 13 | 2.3 | 4.2 |
| 14 | 2.3 | 4.5 |
| 15 | 2.1 | 4.0 |
| 16 | 2.0 | 4.5 |
| Out of scope of invention example 1 | — | — |
| Out of scope of invention example 2 | — | — |

As is evident from the results of Table 1, the film coated with a coating formulation comprising silicone-in-water emulsion of the present invention as an additive provided a narrow particle size distribution which is demonstrated by the values for $D_v50$ and $D_v90$. The results for the particle size distribution could not be obtained for the examples which are out of scope of the invention as the emulsion became unstable due to coagulation.

Preparation of a Coating Formulation

Coating formulations containing an acrylic emulsion, representative of an industrial paint formulation, were formulated in the amounts as provided in Table 2.

TABLE 2

| Raw material | Weight (g) |
| --- | --- |
| Joncryl ® 8052 | 181.54 |
| De-mineralized water | 18.46 |
| Total | 200 |

Coating formulations with silicone emulsions (additives) were prepared by adding 0.5 wt.-% and 1.0 wt.-% of the silicone-in-water emulsion according to the present invention to the coating formulation, with Dispermat® at 2500 rpm for 2 minutes as provided in Table 3.

TABLE 3

| Raw material | Additive (g) |
| --- | --- |
| Coating formulation | 9.95 |
| Additive (0.5 wt.-% or 1 wt.-%) | 0.05 |
| Total | 10 |

Measurement of the Dynamic Coefficient of Friction (CoF)

The paint was coated on PET film with a draw down bar of 60 μm at the speed of 20 mm/s. The dried films were visually inspected and compared with the film without additives. The dynamic coefficient of friction (CoF) was measured after 1 week. The films with the inventive examples had a CoF lower than 0.3. It was experimentally determined that the best slip needs a value of the dynamic coefficient of friction (CoF) of around 0.2. The results of particle size distribution for the inventive examples and out of scope of the invention examples have been summarized in Table 4 below.

TABLE 4

| Example numbers | Dynamic coefficient of friction (CoF) |
| --- | --- |
| 1 | 0.28 |
| 2 | 0.26 |
| 3 | 0.24 |
| 4 | 0.23 |
| 5 | 0.28 |
| 6 | 0.24 |
| 7 | 0.23 |
| 8 | 0.21 |
| 9 | 0.22 |
| 10 | 0.2 |
| 11 | 0.2 |
| 12 | 0.23 |
| 13 | 0.22 |
| 14 | 0.24 |
| 15 | 0.21 |
| 16 | 0.22 |
| Out of scope of the invention example 1 | — |
| Out of scope of the invention example 2 | — |

As is evident from the results of Table 4, the film coated with a coating formulation comprising silicone-in-water emulsion of the present as an additive provided a low value of CoF which provides a better slip resistance. The results of CoF could not be obtained for the examples which are out of scope of the invention as the emulsion became unstable due to coagulation.

The invention claimed is:

1. A process of making a silicone-in-water emulsion comprising
   i) contacting at least one silicone with at least one organic non-polar solvent to obtain a solution;
   ii) adding at least one anionic surfactant selected from the group consisting of metal salts of monoalkyl sulfosue metal salts of dialkyl sulfosuccinates, metal salts of alkyl sulfates, metal salts of alkyl ether sulfates, metal salts of olefin sulfonates, metal salts of linear alkyl benzene sulfonates, alkoxylated alkyl polyglycol ether phosphates, metal salts of alkoxylated alkyl polyglycol ether phosphates, metal salts of alkyl phosphate esters, metal salts of alkyl ether phosphates, and metal salts of alkyl-aryl ether phosphates to the solution obtained in step i) to obtain a mixture;
   iii) adding water under shear, applied to the mixture obtained in step ii), to obtain a silicone-in-water emulsion; and
   iv) removing the at least one organic non-polar solvent,
   wherein the silicone-in-water emulsion has a particle size distribution Dv50 in the range from ≥1 μm to ≤10 μm, determined according to dynamic light scattering technique with a fixed scattering angle of 90°;
   wherein the at least one silicone has a viscosity in the range from ≥1.0 m²/sec to ≤30000 m²/sec at a temperature of 25° C., according to DIN 53019, and
   wherein the particle size distribution Dv90 of the silicone-in-water emulsion is in the range from ≥0.1 μm to ≤25 μm determined according to dynamic light scattering technique with a fixed scattering angle of 90°.

2. The process according to claim 1, wherein the particle size distribution Dv90 of the silicone-in-water emulsion is in the range from ≥1 μm to ≤25 μm determined according to dynamic light scattering technique with a fixed scattering angle of 90°.

3. The process according to claim 1, wherein the at least one organic non-polar solvent has a polarity index in the range from ≥0.0 to ≤4.5.

4. The process according to claim 1, wherein the at least one organic non-polar solvent is selected from the group consisting of benzene, toluene, xylene, hexamethyldisiloxane, carbon tetrachloride, cyclohexane, pentane, hexane, cyclohexane, and chloroform.

5. The process according to claim 1, wherein the at least one organic non-polar solvent is selected from the group consisting of hexamethyldisiloxane and xylene.

6. The process according to claim 1, wherein the at least one organic non-polar solvent is xylene.

7. The process according to claim 1, wherein in step i) the weight ratio of the at least one silicone to the at least one organic non-polar solvent is from 1:20 to 1:1.

8. The process according to claim 1, wherein the solution obtained in step i) has a viscosity in the range from ≥0.1 Pa's to 100 Pa's at a temperature of 25° C. according to a rheometer with a cone-plate geometry of 25 mm diameter with cone angle 1° with the shear rate of 1 s⁻¹.

9. The process according to claim 1, wherein step i) is carried out at a temperature in the range from ≥30° C. to 150° C.

10. The process according to claim 1, wherein the at least one anionic surfactant is a sodium salt of dialkyl sulfosuccinate, wherein alkyl is linear or branched, unsubstituted $C_8$, $C_9$ or $C_{10}$ alkyl.

11. The process according to claim 1, wherein the at least one anionic surfactant is selected from the group consisting of sodium dioctyl sulfosuccinate and sodium di(2-ethylhexyl) sulfosuccinate.

12. The process according to claim 1, wherein the at least one anionic surfactant is a sodium salt or potassium salt of an alkyl sulfate, wherein alkyl is linear, unsubstituted $C_8$, $C_{10}$, $C_{12}$ or $C_{14}$ alkyl.

13. The process according to claim 1, wherein the at least one anionic surfactant is sodium dodecyl sulfate.

14. The process according to claim 1, wherein the at least one anionic surfactant is alkoxylated alkyl polyglycol ether phosphates.

15. The process according to claim 1, wherein in step ii) the weight ratio of the at least one anionic surfactant to the at least one silicone is from 1:1 to 1:50.

16. The process according to claim 1, wherein step ii) is carried out at a temperature in the range from ≥30° C. to 150° C.

17. The process according to claim 1, wherein the silicone-in-water emulsion has a particle size distribution Dv50 in the range from ≥1 μm to ≤5 μm, determined according to dynamic light scattering technique with a fixed scattering angle of 90°;
wherein the particle size distribution Dv90 of the silicone-in-water emulsion is in the range from ≥2 μm to ≤7 μm determined according to dynamic light scattering technique with a fixed scattering angle of 90°,
and
wherein an amount of the organic non-polar solvent is from ≥1 ppm to ≤1000 ppm after step iv).

* * * * *